United States Patent [19]

Trepka

[11] 4,402,844

[45] Sep. 6, 1983

[54] VISCOSITY INDEX IMPROVERS WITH DISPERSANT PROPERTIES PREPARED BY REACTION OF LITHIATED HYDROGENATED COPOLYMERS WITH SUBSTITUTED AMINOLACTAMS

[75] Inventor: William J. Trepka, Bartlesville, Okla.

[73] Assignee: Phillips Petroleum Company, Bartlesville, Okla.

[21] Appl. No.: 314,297

[22] Filed: Oct. 23, 1981

[51] Int. Cl.$^3$ .......................... C10M 1/54; C08F 8/30
[52] U.S. Cl. .............................. 252/51.5 A; 525/366; 525/375
[58] Field of Search ................. 252/51.5 A; 525/366, 525/375

[56] References Cited

U.S. PATENT DOCUMENTS

| | | | |
|---|---|---|---|
| 3,554,911 | 1/1971 | Schiff et al. | 252/59 |
| 3,772,196 | 11/1973 | St. Clair et al. | 252/32.7 E |
| 4,145,298 | 3/1979 | Trepka | 252/51.5 A |
| 4,181,618 | 1/1980 | Durand et al. | 252/51.5 A |
| 4,222,882 | 9/1980 | Brulet et al. | 252/51.5 A |
| 4,229,308 | 10/1980 | Brulet et al. | 252/47 |

FOREIGN PATENT DOCUMENTS 2437417  4/1980  France .

*Primary Examiner*—W. J. Shine

[57] ABSTRACT

Nitrogen-containing copolymers useful as viscosity index improvers with dispersing characteristics are prepared by the reaction of lithiated hydrogenated conjugated diene-monovinylarene copolymers with substituted aminolactams.

22 Claims, No Drawings

VISCOSITY INDEX IMPROVERS WITH DISPERSANT PROPERTIES PREPARED BY REACTION OF LITHIATED HYDROGENATED COPOLYMERS WITH SUBSTITUTED AMINOLACTAMS

FIELD OF THE INVENTION

The invention relates to novel copolymers. The invention further relates to improved lubricating oils. The invention also pertains to lubricating oil additives.

BACKGROUND OF THE INVENTION

Mineral oil stocks remain a prime source of lubricants for an almost endless list of applications. Nearly all lubricants are formulated with a variety of additives. Additives usually are classified according to their intended function such as dispersant; oxidation, corrosion and rust inhibitor; viscosity-index (VI) improver; pour-point depressant; and antiwear agents; antifoam agents; and the like.

The advent of high speed automotive engines in particular, coupled with increased engine operating temperatures and increased complexity of antipollution devices associated with such engines, has resulted in substantial increases in additive quantities in automotive lubricating oils. The quantities of additives employed in some instances have been approaching quantities so large as to affect negatively the primary mission of the lubricating oil: to lubricate. Needed is a single additive which will provide a multiple function to satisfy at least some of the basic requirements of individual additives for lubricating and other oils now presently provided by a package of several additives. With such an additive, the quantity of overall additives employed in the lubricating oil potentially could be substantially reduced, permitting a single effective unit quantity to fulfill multiple requirements.

BRIEF SUMMARY OF THE INVENTION

I have discovered a new class of copolymers particularly useful in providing both viscosity index improver effects plus dispersant effects. These copolymers are the reaction product of a metalated (lithiated) hydrogenated conjugated diene-monovinylarene copolymer with a special class of substituted aminolactams N-dialkylaminopyrrolidones as grafting agents.

These new copolymers resulting from the grafting with the substituted aminolactams provide outstanding viscosity index improvement plus acting as effective dispersants. Lubricating oils and related fluids containing my additives best are provided with the benefits of viscosity index improvers and sludge dispersants at one and the same time with a single additive.

DETAILED DESCRIPTION OF THE INVENTION

The copolymers which I have prepared, and which are employed in lubricating and other oil-based applications as additives to base mineral oils, synthetic oils, and the like, are prepared by copolymerizing at least one hydrocarbon conjugated diene with at least one monovinylarene hydrocarbon, preferably butadiene and styrene, to produce copolymers; hydrogenating the copolymer to produce a hydrogenated copolymer in which the double bonds attributable to the conjugated diene are saturated without substantial saturation of the aromatic double bonds; lithiating the hydrogenated copolymers; reacting the lithiated hydrogenated copolymers with substituted aminolactams. The resulting grafted polymers are polar hydrogenated copolymers, stable, resistant to heat-deterioration, resistant to oxidated degradation, and are of a type to have significant viscosity index improving capabilities when incorporated into lubricating oils, with sufficient solubility to be formulated into the lubricating oils adequately, yet possess significant shear stability in such medium, and at the same time contributing desirable dispersant properties to the oil to provide sludge dispersing benefits.

Conjugated Diene/Monovinylarene Copolymers

In my discussion hereinafter for simplicity and convenience I use styrene as a representative as well as the preferred monovinylarene, and butadiene as a representative as well as the preferred conjugated diene. Similarly butadiene/styrene copolymers are discussed as representative of the applicable conjugated diene/monovinylarene copolymers generally.

Conjugated diene monomers suitable for making copolymers of my invention are those aliphatic hydrocarbon dienes of four to eight carbon atoms per molecule. Exemplary dienes include butadiene, isoprene, 2,3-dimethylbutadiene, piperylene, and the like.

Monovinylarene monomers suitable for use in making copolymers of my invention are the hydrocarbon monovinylarenes of eight to fifteen carbon atoms per molecule. Exemplary monovinylarenes include styrene, 3-methylstyrene, 3,5-diethylstyrene, 4-tolylstyrene, and the like.

Exemplary copolymers include those of butadiene and styrene, isoprene and styrene, butadiene and alpha-methylstyrene, and isoprene and alpha-methylstyrene.

Suitable copolymers will contain about 20 to 80 percent by weight copolymerized styrene, the balance then being copolymerized butadiene, more preferably about 50 to 65 weight percent styrene and the balance butadiene. These copolymers presently preferably are substantially random copolymers, but can contain significant blocks of polystyrene and/or blocks of polybutadiene and/or blocks of random or random tapered butadiene/styrene. These copolymers also can be presented by such as B/A, A-B, B/A-A, and wherein A is a block of polystyrene, B is a block of polybutadiene, and B/A represents either a random copolymer block of butadiene/styrene, or a tapered block of butadiene/styrene, with the realization that B/A also can contain appreciable block structure of polystyrene. The use of the designation B/A when used with reference to tapered random blocks indicates the direction of taper with the B/A blocks, while random, gradually decreases in content of the first indicated monomer along the block, due to the mode of preparation used. The block polystyrene A content of the random block copolymer B/A-A preferably should be in the range of about 15 to 35, more preferably 15 to 25, weight percent.

The butadiene/styrene copolymers which are employed to prepare my additives should have a number average molecular weight in the approximate range of 20,000 to 300,000, presently preferred about 25,000 to 100,000. The copolymers, as far as the butadiene portion, will have a vinyl content prior to hydrogenation of about 20 to 95 weight percent, preferably about 20 to 70 weight percent. The copolymers must be of a type and molecular weight to provide significant viscosity index improving properties to the oil when so used, to have sufficient oil-solubility to be formulated into lubricating oils, and to possess significant shear stability in such oil formulations.

The copolymers of butadiene/styrene employable in accordance with my invention can be prepared by any suitable techniques known in the art.

Most typically, a mixture of butadiene and styrene monomers can be polymerized by contacting the monomers with a hydrocarbon monolithium initiator. Any of the hydrocarbon monolithium initiators known in the anionic solution polymerization arts can be employed. Typically these can be represented by RLi wherein R is a hydrocarbon radical and can be aliphatic, cycloaliphatic, or aromatic, containing at least one carbon atom per molecule. The number of carbon atoms and consequently the molecular weight of the hydrocarbon lithium initiator is not limited as far as operability is concerned, though those of up to about 20 carbon atoms are more readily available. Most frequently employed are the aliphatic monolithium types. Exemplary species include such as n-butyllithium, sec-butyllithium, n-decyllithium, phenyllithium, 1-naphthyllithium, p-tolyllithium, cyclohexyllithium, eicosyllithium, and the like. The presently preferred species are sec-butyllithium and n-butyllithium for commercial availability. If an n-alkyllithium initiator is employed, it usually is advisable to include a minimal amount of a polar compound, such as tetrahydrofuran, to increase initiator activity and efficiency. Such a polar compound may also act as a randomizer.

Such hydrocarbyl monolithium initiators are employed in an amount effective for polymerization of the monomer charge employed to the molecular weight desired. Typically, an exemplary amount of such initiator would be in the range of about 0.33 to 5 mhm, millimoles per 100 grams of monomer, presently preferred about 1 to 4 mhm, consistent with obtaining polymers of presently preferred molecular weight ranges.

Polymerization is conducted by contacting the monomer charge with the monolithium initiator in a suitable diluent. Diluents employed for the purpose include any of the paraffinic, cycloparaffinic, or aromatic hydrocarbons known to the art, used alone or in admixture, typically of 4 to 10 carbon atoms per molecule in commercial operations. Exemplary species include such as n-heptane, cyclohexane, n-hexane, benzene, toluene, the xylenes, 2,2,4-trimethylpentane, and the like. Cyclohexane currently is preferred for ease of handling, high solubility of polymer, and availability.

Polymerization can be carried out at any convenient temperature employed in the solution polymerization arts. Suitable and exemplary temperatures lie in the range of from less than about 0° C. to over 200° C., presently preferred about 40° C. to 100° C. since these temperatures are consistent with obtaining the desired copolymers. The pressures employed can be as convenient, though preferably pressures are employed sufficient to maintain monomers and diluent substantially in the liquid phase. The polymerization times can vary widely as may be convenient, and will, of course, be affected by polymerization temperatures chosen. Time preferably should be chosen such that substantialy complete conversion of monomers is obtained.

To prepare the A-B copolymeric structure, either styrene or butadiene can be first polymerized and then the other monomer added and polymerized to result in the A-B copolymer.

Alternatively, a mixture of the butadiene and styrene monomers can be copolymerized in desired proportion under randomizing conditions to produce a B/A copolymer. In another mode, a B/A structure can be first prepared by polymerizing a suitable butadiene/styrene admixture to the desired degree of conversion, and this usually will produce a tapered block since butadiene tends to polymerize somewhat faster to start with, and then subsequently additional styrene can be added to form an A block onto the first formed B/A block. Alternatively, and presently preferred, a mixture in a suitable ratio of butadiene and styrene can be copolymerized, under limited randomizing conditions, and this then permits formation of a preferred B/A-A structure since the faster polymerization of the butadiene exhausts the butadiene, and remaining styrene then block homopolymerizes.

Where a substantially random B/A portion is desired, employment of a randomizing agent can be included at the suitable stage in the polymerization, typically selected from ethers, thioethers, and amines, and others as is known in the art, typically such as tetrahydrofuran, or from the alkali metal alkoxides other than of lithium, typically such as potassium t-butoxide or amyloxide.

Randomizing agents suitable for use can be chosen from among the following and similar compounds which can be characterized as moderately active randomizers or strongly active randomizers. Among those compounds that can be generally characterized as moderately active randomizers are tetrahydrofuran and methyl ethyl ether. Randomizers that can be generally characterized as strongly active can be chosen from among 1,2-dimethoxyethane, dimethyl ether, N,N,N',N'-tetramethylethylenediamine, bis(2-methoxyethyl)ether, and 1,2-bis(2-methoxyethoxy)ethane.

In this invention strongly active randomizers are employed within the range of about 0.05 to about 5 parts per hundred monomers, preferably about 0.1 to about 2.5 parts per hundred monomers. In the process of this invention moderately active randomizers are employed within a range of about 1 to about 20 parts by weight per hundred monomers, preferably within the range of about 1.5 to about 15 parts by weight per hundred monomers.

Other randomizers of lesser activity include diethyl ether, di-n-propyl ether, di-n-octyl ether and dioxane. These compounds are less preferred in view of their comparatively low degree of randomizer activity. These less active randomizers are empolyed within a range of about 5 to about 100, preferably from about 10 to about 30, parts by weight per hundred parts monomers.

As is known in the art, various substances are known to be detrimental to the initiator, including such as carbon dioxide, oxygen, or water, and the like. It thus is preferable that the reactants, apparatus involved, diluents, and the like, be maintained substantially free of such materials.

Hydrogenation

The hydrogenation procedure employed should be effective so as to substantially reduce olefinic unsaturation, including vinyl unsaturation, while leaving essentially untouched aromatic unsaturation present in the styrene-derived portion of the copolymer.

Hydrogenation can be conveniently conducted directly on the unquenched polymerization reaction admixture from the polymerization procedure described above. Alternatively, where convenient, the copolymerization can be quenched by addition of suitable amounts of a lower alcohol, water, or the like, to effectively kill active polymer-lithium species. The quenched copolymer then can be coagulated and recovered, by means known in the art, such as by steam-stripping. For hydrogenation purposes, suitable copolymers can be dissolved or redissolved in a suitable hydrocarbon solvent, such as from among those described as for polymerization diluents. Hydrogenation is accomplished by treating the suitable butadiene/styrene copolymer dissolved in such a solvent, by means known in the art for this purpose.

Particularly, favorable hydrogenation catalysts comprise reaction products of aluminum alkyl compounds with either nickel or cobalt carboxylates or alkoxides. Typical of the aluminum alkyl compounds are such as triisobutylaluminum, triethylaluminum, tri-n-propylaluminum, and the like. Exemplary nickel or cobalt carboxylates or alkoxides include the nickel and cobalt acetates, propionates, benzoates, octoates, and the butoxides, ethoxides, isopropoxides, and the like. Other suitable hydrogen catalysts include reduced nickel-kieselguhr catalyst.

Exemplary hydrogenation conditions include hydrogenation of the copolymer in a hydrocarbon diluent, and hydrogenation can be conducted, if desired, as described, in the polymerization diluent. Exemplary hydrogenation temperatures lie in the range of about 25° C. to 175° C. Pressures can range up to such as about 1,000 psig. Times can range from a few minutes such as about 30 minutes to several hours such as 4 hours or more, influenced not only by the temperature and pressure chosen, but also by the concentration of the copolymer in the diluent, since this affects the viscosity of the copolymeric solution being treated.

By effective selective hydrogenation, wherein substantially complete reduction of olefinic double bonds is obtained, the reduction of at least about 95 weight percent or more of the olefinic groups will have been obtained, and about 5 percent or less of the phenyl groups will have been hydrogenated.

Following completion of the copolymer hydrogenation step, the hydrogenation catalyst must be deactivated and removed to avoid interference in the succeeding lithiation steps. Conveniently, the total hydrogenation reaction mixture can be treated to deactivate the residual catalyst by any means known in the art. A typical procedure includes the addition of a solution of such as phosphoric acid and ammonium phosphate in such about a 1:4 weight ratio, followed by introduction of air to convert the catalyst metals to insoluble phosphates, and removal thereof by filtration. The hydrogenated copolymer can be recovered by known methods, such as alcohol coagulation or steam stripping, dried under reduced pressure, followed by redissolving in an inert diluent, such as those described for the polymerization solvent, for the subsequent metalation and grafting procedures. Alternatively, the polymer cement, i.e., the hydrogenated copolymer still dissolved in the diluent employed, after removal of the insoluble catalyst phosphates by filtration, can be dried by conventional means and the metalation and grafting steps then conducted on the dried, i.e., water free, polymer-cement, the entire process from polymerization through grafting thus being readily adaptable to continuous operation.

Alternatively, a suitable hydrogenated copolymer of hereinbefore described characteristics can be dissolved in a suitable hydrocarbon diluent for the metalation and grafting steps in accordance with my invention.

Washing Step

It may be desirable to wash the polymer cement, after the hydrogenation step and after removal of hydrogenation catalyst residues, with a dilute aqueous caustic solution. This washing step has been found helpful in removing apparatus metalation poisons. The washed polymer cement then is washed with water, separated from the washing solution (e.g., by flashing), dried, and subjected to metalation.

Metalation

The hydrogenated butadiene-styrene copolymer is metalated using an organolithium composition in conjunction with a polar compound in order to introduce lithium atoms along the hydrogenated copolymeric structure.

The metalation step is carried out by means of a complex formed by the combination of a lithium component which can be represented by $R'(Li)_x$ with a polar metalation promoter. The polar compound and the lithium component can be added separately or can be premixed or pre-reacted to form an adduct prior to addition to the solution of the hydrogenated copolymer. In the compounds represented by $R'(Li)_x$, the R' is usually a saturated hydrocarbon radical of any length whatsoever, but ordinarily containing up to 20 carbon atoms, and can be an aromatic radical such as phenyl, naphthyl, tolyl, 2-methylnaphthyl, etc., or a saturated cyclic hydrocarbon radical of e.g., 5 to 7 carbon atoms, a monounsaturated cyclic hydrocarbon radical of e.g. 5 to 7 carbon atoms, an unconjugated, unsaturated aliphatic hydrocarbon radical of 1 to 20 carbon atoms, or an alkyllithium having one or more aromatic groups on the alkyl group, the alkyl group containing 1 to 20 carbon atoms. In the formula, $R'(Li)_x$ x is an integer of 1 to 3. Representative species include, for example: methyllithium, isopropyllithium, sec-butyllithium, n-butyllithium, t-butyllithium, n-dodecyllithium, phenyllithium, alpha- and beta-naphthyllithium, any biphenyllithium, styryllithium, benzyllithium, indenyllithium, 1-lithio-3-butene, 1-lithiocyclohexene-3,1-lithiocyclohexene-2, 1,4-dilithiobutane, 1,4-dilithiobenzene, 1,3,5-trilithiopentane, 1,3,5-trilithiobenzene, and the like.

Lithium adducts of polynuclear aromatic hydrocarbons, such as those described in U.S. Pat. No. 3,170,903, also can be employed, for example, lithium adducts of biphenyl, naphthalene, anthracene or stilbene. Lithium compounds alone usually metalate copolymers containing aromatic and olefinic functional groups with considerable difficulty and under high temperatures which may tend to degrade the copolymer. However, in the presence of tertiary diamines and bridgehead monoamines, metalation proceeds rapidly and smoothly. Some lithium compounds can be used alone effectively, notably the menthyllithium types.

Theoretically, though I do not wish to be bound by theory, it is presently believed likely that the metalation occurs at a carbon to which an aromatic group is attached, or in an aromatic group, or in the event that the polymer is not completely hydrogenated, in positions allylic to residual double bonds, or in more than one of these positions. In any event, it is believed that a very large number of lithium atoms are positioned variously along the polymer chain, attached to internal carbon atoms away from the polymer terminal carbon atoms, either along the backbone of the polymer or on groups pendant therefrom, or both, in a manner depending upon the distribution of reactive or lithiatable positions. This distinguishes the lithiated copolymer from simple terminally reactive polymeers prepared by using a lithium or even a polylithium initiator in polymerization, thus limiting the number and the location of the positions available for subsequent attachment. With the metalation procedure described herein, the extent of the lithiation will depend upon the amount of metalating agent used and/or the groups available for metalation.

The polar compound promoters include a variety of tertiary amines, bridgehead amines, ethers, and metal alkoxides.

The tertiary amines useful in the metalation step have three saturated aliphatic hydrocarbon groups attached to each nitrogen and include, for example:

(A) Chelating tertiary diamines, preferably those of the formula $(R^2)_2N-C_yH_{2y}-N(R^2)_2$ in which each $R^2$ can be the same or different straight- or branched-chain alkyl group of any chain length containing up to 20 carbon atoms or more all of which are included herein, and y can be any whole number from 2 to 10, and particularly the ethylene diamines in which all alkyl substituents are the same. These include, for example: tetramethylethylenediamine, tetraethylethylenediamine, tetradecylethylenediamine, tetraoctylhexylenediamine, tetra-(mixed alkyl)ethylene diamines, and the like.

(B) Cyclic diamines can be used, such as, for example, the N,N,N',N'-tetraalkyl 1,2-diamino cyclohexanes, the N,N,N',N'-tetraalkyl 1,4-diamino cyclohexanes, N,N'-dimethylpiperazine, and the like.

(C) The usual bridgehead diamines include, for example, sparteine, triethylenediamine, and the like.

Tertiary monoamines such as triethylamine are generally not as effective in the lithiation reaction. However, bridgehead monoamines such as 1-azabicyclo[2.2.2]octane and its substituted homologs are effective.

Ethers and the alkali metal alkoxides are presently less preferred than the chelating amines as activators for the metalation reaction due to somewhat lower levels of incorporation of nitrogen-containing compounds onto the copolymer backbone in the subsequent grafting reaction.

The milliequivalents of lithium employed for the desired amount of lithiation generally range from such as about 5 to 95, presently preferably about 10 to 20 per hundred grams of copolymer to be modified. Generally equimolar amounts of the polar promoter and the lithium component (based on the carbon-bound lithium) will be employed. The molar ratio of active lithium to the polar promoter can vary from such as 0.01 to 1.5. There appears to be little advantage, however, in using a molar ratio above about 1:1.

In general, it is most desirable to carry out the lithiation reaction in an inert solvent such as saturated hydrocarbons. Aromatic solvents such as benzene are lithiatable and may interfere with the desired lithiation of the hydrogenated copolymer. The solvent/copolymer weight ratio which is convenient generally is in the range of about 5:1 to 20:1. Solvents such as chlorinated hydrocarbons, ketones, and alcohols, should not be used because they destroy the lithiating compound.

The process of lithiation can be carried out at temperatures in the range of such as about −70° C. to +150° C., presently preferably in the range of about 0° C. to 100° C., the upper temperatures being limited by the thermal stability of the lithium compounds. The lower temperatures are limited by considerations of production rate, the rate of reaction becoming unreasonably slow at low temperatures. The length of time necessary to complete the lithiation and subsequent reactions is largely dependent upon the temperature. Generally the time can range from a few minutes to about 24 hours, presently preferably from about 30 minutes to 3 hours.

The extent of lithiation desired depends on the nature of the grafted product desired. A weight percent nitrogen of from about 0.01 to 5, preferably from 0.05 to 0.5, is suitable for providing dispersancy to the butadiene-styrene copolymers which are suitable as VI improvers of my invention. The amount of lithiation required depends on the molecular weight of the backbone polymer, the molecular weight of the nitrogen-containing compound utilized in the grafting reaction, and the weight percent nitrogen desired in the product polymer of my invention.

Grafting Step With Substituted Aminolactams

The next step in the process of preparing my novel grafted hydrogenated copolymers is the treatment of the lithiated hydrogenated copolymers, in solution, and without quenching in any manner to destroy the lithium sites, with a substituted aminolactam as hereinbefore described.

These substituted aminolactams can be represented generically by

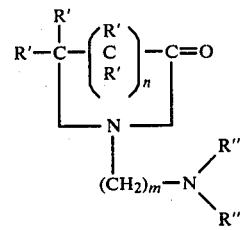

wherein each R' represents hydrogen or an aliphatic, cycloaliphatic, aromatic radical, or combinations thereof; each R" represents an aliphatic, cycloaliphatic, or aromatic radical, or combinations thereof; n is an integer of 1, 2, 3, 4, or 5; m is an integer of 1 to 12; the total number of carbon atoms in R' and R" substituents is 1 to 12.

Typical examples, but non-limiting examples, of the substituted aminolactams include:

N-(N',N'-dimethylamino-ethyl)-γ-butyrolactam;
N-(N',N'-dimethylamino-ethyl)-2-pyrrolidone;
also called N-(N',N'-dimethylamino-ethyl)-δ-valerolactam;
N-(N',N'-dimethylamino-propyl)-2-pyrrolidone;
N-(N',N'-diethylamino-propyl)-2-pyrrolidone;
N-(N',N'-dimethylamino-propyl)-3-methyl-2-pyrrolidone;
N-(N',N'-dimethylamino-propyl)-ε-caprolactam;

presently preferably the species N-(N',N'-dimethylamino-propyl)-2-pyrrolidone. Of course, other species meeting the generic formula can be employed, wherein R and R' are for example, butyl, cyclohexyl, phenyl, or other known radicals as described.

The grafting step is carried out under any suitable conditions to provide my modified copolymer having the desired nitrogen content, which I term a grafted hydrogenated copolymer. Generally, the grafting is done at an effective temperature in the range of such as about 0° C. to 100° C., for an effective time of such as about 0.01 to 10 hours, preferably using at least about one mole of suitable nitrogen-containing compound for each equivalent of copolymer lithium to insure substantially complete reaction of and utilization of the lithium. The grafting step is carried out immediately following the metalation step without prior separation or purification steps so as to preserve the lithium sites.

The modified polymer is recovered using any convenient means such as by coagulation treatment with a lower alcohol followed by filtration and any desired purification steps.

Oil Compositions

The nitrogen-containing copolymeric compositions in accordance with my invention can be incorporated as needed into oils including lubricating and other oils using any suitable procedures.

In the preparation of lubricating compositions, various mineral oils are employed. Generally, there are of petroleum origin and are complex mixtures of many hydrocarbon compounds, though they can be derived from coal conversion, tar sands, shale oil, and the like. Preferably, the mineral oils are refined products such as are obtained by well-known refining processes, such as by hydrogenation, by polymerization, by dewaxing, etc. Frequently, the oils have a Saybolt viscosity at 100° F. in the range of about 60 to 5,000, and a Saybolt viscosity at 210° F. of about 30 to 250. The oils can be of paraffinic, naphthenic, or aromatic types, as well as mixtures of two or more types. However, the additives of my invention have special advantages when employed with paraffinic types of oils such as are obtained by solvent extraction of a suitable refinery stream. Many suitable lubricating compositions are available as commercial products, such as those used as motor oils, gear oils, automatic transmission oils, and the like.

In addition to the additives of this invention, the lubricating compositions can comprise one or more of other additives known to those skilled in the art, such as antioxidants, pour-point depressants, dyes, detergents, etc. Examples of these additives are the metal petroleum sulfonates, zinc dialkyldithiophosphates, alkyl succinimides, and the like. To be of commercial interest as a motor oil, the lubricating composition generally preferably presently should have a viscosity index of at least about 130.

My unique nitrogen-containing copolymers find application in use in lubricating oils, automatic transmission fluids, tractor hydraulic fluids, industrial hydraulic oils, aviation oils, and the like, in any broad effective range. A suggested broad amount is in the range of such as about 0.5 to 10 volume percent. For most usages, the presently preferred range is about 0.5 to 5 volume percent in motor oils, and similarly in industrial hydraulic fluids. Typical usages anticipated in specific applications are about 3 to 5, preferably about 3.75, volume percent in automotive transmission fluids, about 1 to 3, preferably about 2, volume percent in industrial hydraulic fluids, about 1 to 3, preferably about 1.3, volume percent in tractor hydraulic fluids, about 8 to 9 volume percent in aviation oils, and about 1 to 3, preferably about 2, volume percent in motor oils.

EXAMPLES

Examples are provided designed to further an understanding of my invention, without limiting the scope thereof. Particular species employed, particular conditions, amounts and materials, ranges and materials, and the like, employed in these examples, are designed to be exemplary, and are directed to one skilled in the art, and are not intended to be limitative of the reasonable scope of my invention.

EXAMPLE I

A commercial Phil-Ad ® VII (a hydrogenated 41/59 butadiene/styrene copolymer produced in accordance with the disclosure of U.S. Pat. No. 3,554,911) was first metalated with n-butyllithium (NBL), according to the following recipe and conditions:

| Recipe I | |
|---|---|
| Phil-Ad ® VII, parts by weight: | 100 |
| Cyclohexane, parts by weight: | 1000 |
| Tetramethylethylenediamine, mhp[a]: | 14 |
| n-butyllithium, mhp[a]: | 14 |
| Temperature, degrees C.: | 70 |
| Time, hours: | 1.5 |

[a]mhp = gram millimoles per 100 grams of polymer

The metalation was carried out employing essentially anhydrous agents and conditions under an inert nitrogen atmosphere. After cooling to 50 degrees C., 15.4 mhp of N-(N',N'-dimethylamino-propyl)-2-pyrrolidone (GAF Corp.: molecular weight 170: density 0.975 g/cc) were added, mixed thoroughly, and kept at 50 degrees C. for one hour.

The resulting mixture of grafted copolymers was terminated with ethanol, filtered, and purified by three successive dissolutions in cyclohexane and coagulations in ethanol. The modified copolymer was dried under vacuum conditions.

Properties of the grafted copolymer are given in Table I:

TABLE I

| Molecular Weight, $M_n$[a] | 60,000 |
|---|---|
| Molecular Weight, $M_w$[a] | 88,000 |
| Heterogeneity Index[b] | 1.48 |
| Inherent Viscosity[c] | 0.85 |
| Gel Content[d], % | 0 |
| Nitrogen Content[e], % | 0.16 |

[a]Molecular weights were determined from gel permeation chromatography curves by a procedure described by G. Kraus and C. J. Stacy, J. Pol. Sci. A-2 10, 657 (1972) and J. Poly. Sci. Symposium No. 43,329 (1973).
[b]Heterogeneity Index = $M_w/M_n$. The higher the heterogeneity index, the broader the molecular weight distribution.
[c]Inherent viscosity was determined according to the procedure given in U.S. Pat. No. 3,278,508, Column 20, Note a, with the modification that the solution was filtered through a glass filter stick of grade C porosity and pressed directly into the viscometer.
[d]Determination of gel was made by immersing an empty wire cage into a toluene solution used for inherent viscosity determination, withdrawing it after 24 hours and weighing it. The cage was calibrated by repeating the procedure for pure toluene. The weight of the dry gel was determined from the difference of the two cage weights.
[e]Nitrogen content was determined with an Antek Nitrogen Analyzer, by complete oxidative pyrolysis of the N—containing sample (about 2 to 8 mg) to nitric oxide and subsequently reacting formed nitric oxide with ozone to metastable nitrogen dioxide, which emits chemiluminescent radiation upon relaxation. The intensity of the chemiluminescence is measured by means of a photomultiplier and is a measure of the N—content of the test sample.

This example illustrates the use of N-(N',N'-dimethylamino-propyl)-2-pyrrolidone for the preparation of a viscosity index improver (VII) having dispersant properties.

EXAMPLE II

This run illustrates the effectiveness of my modified copolymer as an ashless dispersant.

A laboratory bench-scale test, referred to as the "carbon spot test" and as generally described in U.S. Pat. No. 3,401,177 was used as a preliminary test for dispersancy. This test entails stirring 50 ml of carbon black into 10 grams of SAE 10 lubricating oil base stock containing 4% of the additive to be tested. A drop of the resulting slurry is dropped onto a polished, stainless steel block heated to 500 degrees F. (260 degrees C.). The extent to which the carbon black is carried to the extremity of the resulting oil ring is a measure of the dispersancy of the additive. An arbitrary scale of 1 to 6 designating very poor (1) to excellent (6) is used for rating. Carbon black in oil without the additives is given a 1 rating, while oil containing the commercial dispersant, Lubrisol 925, a commercially available alkyl succinimide, has a 6 rating. Using this test, the oil containing my N-(N',N'-dimethylamino-propyl)-2-pyrrolidone-grafted copolymer prepared as described in Example I was given a 4 rating.

EXAMPLE III

Another bench-scale dispersancy test was carried out as follows:

Four grams of the experimental polymer described in Example I were dissolved in 96 grams of n-decane. To this solution 3 ml of an engine sludge obtained from an engine oil run without a dispersant were added to the solution. The test mixture was agitated for 24 hours at 70 degrees C. The bottle was allowed to cool, and a sample was poured into a vial. Percent light transmittance through the suspension was measured at time=0, 24 hours, and 48 hours, by using a Brinkman, PC/1000 colorimeter at 545μ and a fiber-optic 30" light guide with a 2 cm stainless steel probe. A change in transmittance over a period time is indicative of the dispersing ability of the test VII. The change in transmittance for the solution containing my N-containing copolymer was 0.1 after 24 hours and 0.3 after 48 hours.

EXAMPLE IV

My modified copolymer of Example I was further evaluated for dispersant properties in a Ford Sequence V-D varnish engine test as described in ASTM special technical publication 315F. My N-modified copolymer was blended into a premium motor oil formulation as a replacement for both the typical VI improver and the ashless sludge dispersant. The test oil formulation was as follows:

| Formulation I | |
|---|---|
| Kansas City 10-Stock[a]: | 57.03 vol. % |
| Kansas City 20-Stock[b]: | 25.0 vol. % |
| Phil-Ad® 100 Solution[c]: | 14.0 vol. % |
| Lubrizol 1395[d]: | 1.22 vol. % |
| Exxon ECA 5118 Solution[e]: | 0.60 vol. % |
| Dispersant VII (invention): | 2.15 vol. % |

[a][b]Commercially available lubricating oils (Phillips Petroleum Co.) which are paraffinic base oils, solvent extracted, and de-waxed. The 10-stock is about 100 SUS at 100° F. The 20-stock is about 330 SUS at 100° F.
[c]A 50 vol. % solution of a commercially available overbased calcium petroleum sulfonate detergent in Kansas City 10-stock oil.
[d]A commercially available zinc dialkydithiophosphate antioxidant and antiwear agent.
[e]A 50 vol. % solution of a commercially available pour point depressant in Kansas City 10-stock oil.

Results from the Sequence V-D engine tests are given in Table II:

TABLE II

| Sequence V-D Engine Test | Invention Dispersant VII | Considered Acceptable for Commercial Formulations |
|---|---|---|
| Average Engine Sludge | 9.6 | 8.5 |
| Average Piston Skirt Varnish | 8.5 | 7.9 |
| Average Engine Varnish | 8.8 | 8.0 |
| Oil Screen Clogging, % | 0 | 5 |
| Oil Ring Clogging, % | 0 | 5 |
| No. Stuck Compression Rings | 0 | 0 |

These data show that my N-(N',N'-dimethylamino-propyl)-2-pyrrolidone-grafted copolymer provides dispersant properties equivalent to or better than those considered acceptable for commercial dispersants.

EXAMPLE V

Two grafted copolymers were prepared in accordance with the procedure and conditions given in Example I, but using a slightly different recipe.

| Recipe II | Polymer A | Polymer B |
|---|---|---|
| (A) Metalation Step: | | |
| Phil-Ad® VII, parts by weight | 100 | 100 |
| Cyclohexane, parts by weight | 1000 | 1000 |
| Tetramethylethylenediamine, mhp | 80 | 92 |
| n-butyllithium, mhp | 14 | 16 |
| (B) Grafting Step: | | |
| N—(N',N'-dimethylamino-propyl)-2-pyrrolidone, mhp | 14 | 16 |

Carbon spot test rating of both polymer samples, carried out in accordance with the procedure described in Example II, was 4.

These two copolymers were dissolved in a lube oil of Formulation II:

| Formulation II | |
|---|---|
| Kansas City 10-Stock | 63.43 vol. % |
| Kansas City 20-Stock | 20.43 vol. % |
| Phil-Ad® 100 Solution | 14.3 vol. % |
| Lubrizol 1395 | 1.25 vol. % |
| Exxon ECA 5118 Solution | 0.61 vol. % |

Viscosity, viscosity index, and pour point of the two oil solutions containing the N-(N',N'-dimethylamino-propyl)-2-pyrrolidone-grafted VI improver copolymer and a premium motor oil as shown in Formulation II are given in Table III:

TABLE III

| | Polymer A | Polymer B |
|---|---|---|
| N—Content in Polymer, weight-% | 0.11 | 0.12 |
| Polymer Concentration in Oil, weight-% | 2.17 | 2.18 |
| Viscosity at 40 degrees C., cSt[a] | 84.20 | 84.70 |
| Viscosity at 100 degrees C., cSt[a] | 13.60 | 13.49 |
| Viscosity Index[b] | 165 | 162 |
| Pour Point, degrees F.[c] | −35 | −40 |

[a]Determined according to ASTM D455-74
[b]Determined according to ASTM D2270-75
[c]Determined according to ASTM D97-66

These runs illustrate the effectiveness of my modified copolymers as multiple-purpose additives, both as VI (viscosity index) improvers, and as ashless detergents.

EXAMPLE VI

This control run demonstrates that grafting of N-alkyl-2-pyrrolidone onto Phil-Ad ® VII does not produce a polymer with desirable dispersant properties. The metalation reaction was carried out in accordance with Recipe I. The grafting agent was N-methyl-2-pyrrolidone (25.4 mhp), which was allowed to react with the metalated Phil-Ad ® VII solution at 70° C. for 10 minutes.

The prepared polymer contained only about 0.043 percent by weight of bound nitrogen. A solution of 10 percent by weight of the N-methylpyrrolidone-grafted VII in Kansas City 10-Stock oil was prepared at elevated temperature and was used after cooling to prepare an oil solution of Formulation III.

| Formulation III | |
|---|---|
| Kansas City 10-Stock | 36.92 vol. % |
| Kansas City 20-Stock | 41.0 vol. % |
| Phil-Ad ® 300[a] | 2.2 vol. % |
| E 686[b] | 1.5 vol. % |
| Lubrizol 1395 | 1.08 vol. % |
| Lubrizol 0545750[c] | 0.5 vol. % |
| DC-200[d] | 10.0 ppm |
| NMP—grafted VII solution[e] | 16.2 vol. % |

[a]an overbased calcium petroleum sulfonate detergent marketed by Phillips Petroleum Co.
[b]a commercial stabilizer marketed by Edmond Cooper Co.
[c]an ashless oxidation inhibitor marketed by Lubrizol [d]a commercial antifoam agent marketed by Dow-Corning
[e]a 10 percent by weight (or 8.93 percent by vol.) solution of N—methyl-2-pyrrolidone grafted-VII (described earlier) in Kansas City 10-Stock oil.

Formulation I was tested in a Ford Sequence V-C varnish engine test (described in ASTM special technical publication 315 F). Engine test results are summarized in Table IV:

TABLE IV

Sequence V-C Engine Test

| | NMP—Modified VII (Control) | Considered Acceptable For Commercial Formulations |
|---|---|---|
| Average Engine Sludge | 2.6 | at least 8.5 |
| Average Piston Skirt Varnish | 7.1 | at least 7.9 |
| Average Engine Varnish | 8.4 | at least 8.0 |
| Oil Screen Clogging, % | 90 | not more than 5 |
| Oil Ring Clogging, % | 0 | not more than 5 |

The results in Table IV show that the N-methyl-2-pyrrolidone modified polymer did not perform satisfactorily because of excessively low engine sludge deposit and piston skirt varnish and excessive oil screen clogging.

The disclosure, including data, has illustrated the value and effectiveness of may invention. The examples, the knowledge and background of the field of the invention and of general principles of chemistry and other applicable sciences, have formed the basis to which the broad descriptions of the invention, including the ranges of conditions and generic groups of operant components have been developed and further together have formed the bases for my claims here appended.

I claim:

1. Shear-stable, oil-based composition, comprising a major amount of an oil selected from mineral oils and synthetic oils, and a minor effective viscosity index improving amount of an oil soluble organo-substituted aminolactam grafted hydrogenated conjugated diene/monovinylarene copolymer dissolved therein;

said copolymer prepared by the process which comprises a lithiating a hydrogenated conjugated diene hydrocarbon/monobinylarene hydrocarbon copolymer, and reacting the resulting lithiated hydrogenated copolymer with an effective amount of a substituted aminolactam, thereby preparing said grafted copolymer;

wherein said substituted aminolactam is represented by

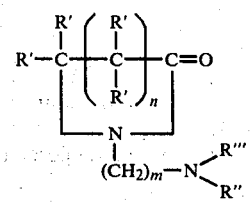

wherein each R' represents hydrogen or an aliphatic, cycloaliphatic, aromatic radical, or combinations thereof; each R" represents an aliphatic, cycloaliphatic, or aromatic radical, or combinations thereof; n is an integer of 1 to 5 inclusive; m is an integer of 1 to 12; and the total number of carbon atoms in R' and R" substituents is 1 to 12.

2. A composition according to claim 1 wherein said grafted copolymer has a number average molecular weight in the range of about 20,000 to 300,000, a vinyl content prior to hydrogenation of about 20 to 95 weight percent, a diene:monovinylarene content of about 80:20 to 20:80, and a nitrogen content of about 0.01 to 5 weight percent.

3. A composition according to claim 2 wherein said grafted copolymer has a number average molecular weight in the range of about 25,000 to 100,000, about 50–65 weight percent monovinylarene and 50–35 weight percent diene, and a vinyl content prior to hydrogenation of about 20 to 70 weight percent.

4. A composition according to claim 3 wherein the mineral oil is a lubricating oil and has a viscosity at 210° F. in the range of about 30 to 250 SUS, and said grafted copolymer exhibits a nitrogen content in the range of about 0.05 to 0.5 weight percent.

5. A composition according to claim 4 wherein said grafted copolymer is employed in an amount in the range of about 0.5 to 10 volume percent relative to the total oil excluding other additives.

6. A composition according to claim 5 wherein said substituted lactam is selected from the group consisting of N-(N',N'-dimethylamino-ethyl)-γ-butyrolactam;
N-(N',N'-dimethylamino-ethyl)-2-pyrrolidone;
N-(N',N'-dimethylamino-propyl)-2-pyrrolidone;
N-(N',N'-diethylamino-propyl)-2-pyrrolidone;
N-(N',N'-dimethylamino-propyl)-3-methyl-2-pyrrolidone; and
N-(N',N'-dimethylamino-propyl)-ε-caprolactam.

7. A composition according to claim 6 wherein said copolymer is a copolymer of butadiene and styrene, isoprene and styrene, butadiene and α-methylstyrene, or isoprene and α-methylstyrene.

8. The composition according to claim 7 wherein said hydrogenated copolymer is a 41/59 weight percent hydrogenated butadiene/styrene block copolymer having a block styrene content of about 20 weight percent, and said nitrogen-containing compound is N-(N',N'-dimethylamino-propyl)-2-pyrrolidone.

9. The composition of claim 1 wherein said copolymer is selected from copolymers represented by B/A, B/A-A, A-B, and mixtures, wherein B/A represents a randomized block of conjugated diene/monovinylarene, which can be tapered, A represents a block of poly(monovinylarene), and B represents a block of poly(conjugated diene).

10. The composition of claim 1 wherein said copolymer contains a random block B/A, and wherein the block polystyrene content is in the range of about 15 to 25 weight percent.

11. The composition of claim 1 wherein said base oil is a lubricating oil having a minimum VI of about 130, wherein said grafted copolymer is employed in an amount of about 0.5 to 5 volume percent relative to the base oil.

12. The composition of claim 1 wherein said base oil is an automotive transmission fluid wherein said grafted copolymer is employed in an amount of about 3 to 5 volume percent.

13. The composition of claim 1 wherein said base oil is an aviation oil wherein said grafted copolymer is employed in an amount of about 8 to 9 volume percent.

14. An oil soluble organo-substituted aminolactam grafted hydrogenated conjugated diene/monovinylarene copolymer prepared by the process which comprises lithiating a hydrogenated conjugated diene hydrocarbon/monovinylarene hydrocarbon copolymer, and reacting the resulting lithiated hydrogenated copolymer with an effective amount of a substituted aminolactam, thereby preparing said grafted copolymer;

wherein said substituted aminolactam is represented by

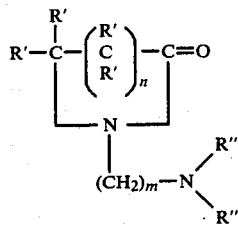

wherein each R' represents hydrogen or an aliphatic, cycloaliphatic, aromatic radical, or combinations thereof; each R'' represents an aliphatic, cycloaliphatic, or aromatic radical, or combinations thereof; n is an integer of 1, 2, 3, 4, or 5; m is an integer of 1 to 12; and the total number of carbon atoms in R' and R'' substituents is 1 to 12.

15. A composition according to claim 14 wherein said grafted copolymer has a number average molecular weight in the range of about 20,000 to 300,000, a vinyl content prior to hydrogenation of about 20 to 95 weight percent, a diene:monovinylarene content of about 80:20 to 20:80, and a nitrogen content of about 0.01 to 5 weight percent.

16. A composition according to claim 15 wherein said grafted copolymer has a number average molecular weight in the range of about 25,000 to 100,000, about 50-65 weight percent monovinylarene and 50-35 weight percent diene, and a vinyl content prior to hydrogenation of about 20 to 70 weight percent.

17. The composition according to claim 16 wherein said grafted copolymer exhibits a nitrogen content in the range of about 0.05 to 0.5 weight percent.

18. The composition according to claim 17 wherein said substituted lactam is selected from the group consisting of N-(N',N'-dimethylamino-ethyl)-γ-butyrolactam;
N-(N',N'-dimethylamino-ethyl)-2-pyrrolidone;
N-(N',N'-dimethylamino-propyl)-2-pyrrolidone;
N-(N',N'-diethylamino-propyl)-2-pyrrolidone;
N-(N',N'-dimethylamino-propyl)-3-methyl-2-pyrrolidone; and
N-(N',N'-dimethylamino-propyl)-ε-caprolactam.

19. A composition according to claim 18 wherein said copolymer is a copolymer of butadiene and styrene, isoprene and styrene, butadiene and α-methylstyrene, or isoprene and α-methylstyrene.

20. The composition according to claim 19 wherein said hydrogenated copolymer is a 41/59 weight percent hydrogenated butadiene/styrene block copolymer having a block styrene content of about 20 weight percent, and said nitrogen-containing compound is N(N',N'-dimethylamino-propyl)-2-pyrrolidone.

21. The composition of claim 14 wherein said copolymer is selected from copolymers represented by B/A, B/A-A, A-B, and mixtures, wherein B/A represents a randomized block of conjugated diene/monovinylarene, which can be tapered, A represents homopolymeric block of poly(monovinylarene), and B represents a block of poly(conjugated diene).

22. The composition of claim 14 wherein said copolymer contains a random block B/A, and wherein the block polystyrene content is in the range of about 15 to 25 weight percent.

* * * * *